(12) United States Patent
Childers et al.

(10) Patent No.: US 6,817,717 B2
(45) Date of Patent: Nov. 16, 2004

(54) DISPLAY SYSTEM WITH LOW AND HIGH RESOLUTION MODULATORS

(75) Inventors: Winthrop D. Childers, San Diego, CA (US); Noah Lassar, San Diego, CA (US); William Allen, Corvallis, OR (US); Mohammad M. Samii, La Jolla, CA (US); Jack H. Schmidt, Carlsbad, CA (US); Mark A. Van Veen, Cardiff by the Sea, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 0 days.

(21) Appl. No.: 10/251,465

(22) Filed: Sep. 19, 2002

(65) Prior Publication Data

US 2004/0057017 A1 Mar. 25, 2004

(51) Int. Cl.⁷ .................. G03B 21/14; G03B 21/26; G03B 21/28; H04N 9/12; G02F 1/1335
(52) U.S. Cl. .................. 353/31; 353/84; 353/94; 353/99; 348/743; 349/5; 349/7
(58) Field of Search .................. 353/31, 84, 94, 353/99; 348/743; 349/5, 7

(56) References Cited

U.S. PATENT DOCUMENTS

| | | | |
|---|---|---|---|
| 4,966,441 A | 10/1990 | Conner | 350/335 |
| 5,151,178 A | 9/1992 | Nickerson et al. | 210/198.2 |
| 5,699,462 A | 12/1997 | Fouquet et al. | 385/18 |
| 5,868,480 A * | 2/1999 | Zeinali | 353/31 |
| 5,971,545 A | 10/1999 | Haitz | 353/31 |
| 5,997,150 A | 12/1999 | Anderson | 362/227 |
| 6,067,185 A | 5/2000 | Albert et al. | 359/296 |
| 6,120,588 A | 9/2000 | Jacobson | 106/31.16 |
| 6,130,774 A | 10/2000 | Albert et al. | 359/296 |
| 6,188,815 B1 | 2/2001 | Schiaffino et al. | 385/16 |
| 6,208,778 B1 | 3/2001 | Donald | 385/17 |
| 6,212,308 B1 | 4/2001 | Donald | 385/16 |
| 6,215,222 B1 | 4/2001 | Hoen | 310/309 |
| 6,224,216 B1 | 5/2001 | Parker et al. | 353/31 |
| 6,232,950 B1 | 5/2001 | Albert et al. | 345/107 |
| 6,242,139 B1 | 6/2001 | Hedrick et al. | 430/7 |
| 6,252,564 B1 | 6/2001 | Albert et al. | 345/1 |
| 6,262,706 B1 | 7/2001 | Albert et al. | 77/7 |
| 6,276,801 B1 * | 8/2001 | Fielding | 353/31 |
| 6,309,071 B1 | 10/2001 | Huang et al. | 353/31 |
| 6,318,863 B1 * | 11/2001 | Tiao et al. | 353/31 |
| 6,323,989 B1 | 11/2001 | Jacobson et al. | 359/296 |
| 6,324,316 B1 | 11/2001 | Fouquet et al. | 385/16 |
| 6,327,072 B1 | 12/2001 | Comiskey et al. | 359/296 |
| 6,341,862 B1 | 1/2002 | Miyazaki et al. | 347/106 |
| 6,570,613 B1 * | 5/2003 | Howell | 348/219.1 |
| 6,591,022 B2 * | 7/2003 | Dewald | 382/274 |
| 6,624,756 B1 * | 9/2003 | Butterworth | 340/815.4 |
| 2003/0048393 A1 * | 3/2003 | Sayag | 349/5 |
| 2003/0142241 A1 * | 7/2003 | Allen et al. | 348/742 |

* cited by examiner

*Primary Examiner*—Rodney Fuller
*Assistant Examiner*—Melissa J Koval

(57) ABSTRACT

A display system is provided, the system including an illumination source configured to produce light and direct light along an optical path, a plurality of color filters disposed in the optical path configured to generate a plurality of colored light beams, and a spatial light modulator disposed in the optical path adapted to receive and adjust the colored light beams to produce an image.

30 Claims, 2 Drawing Sheets

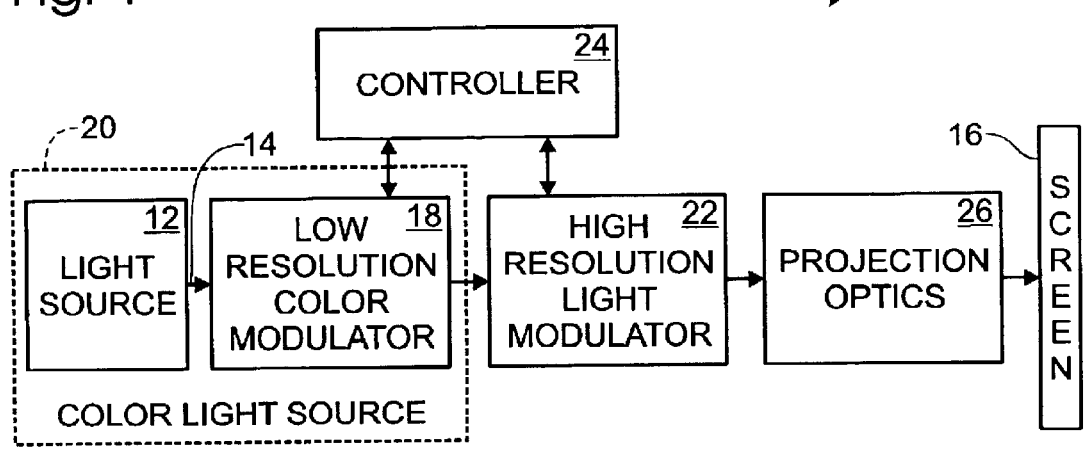
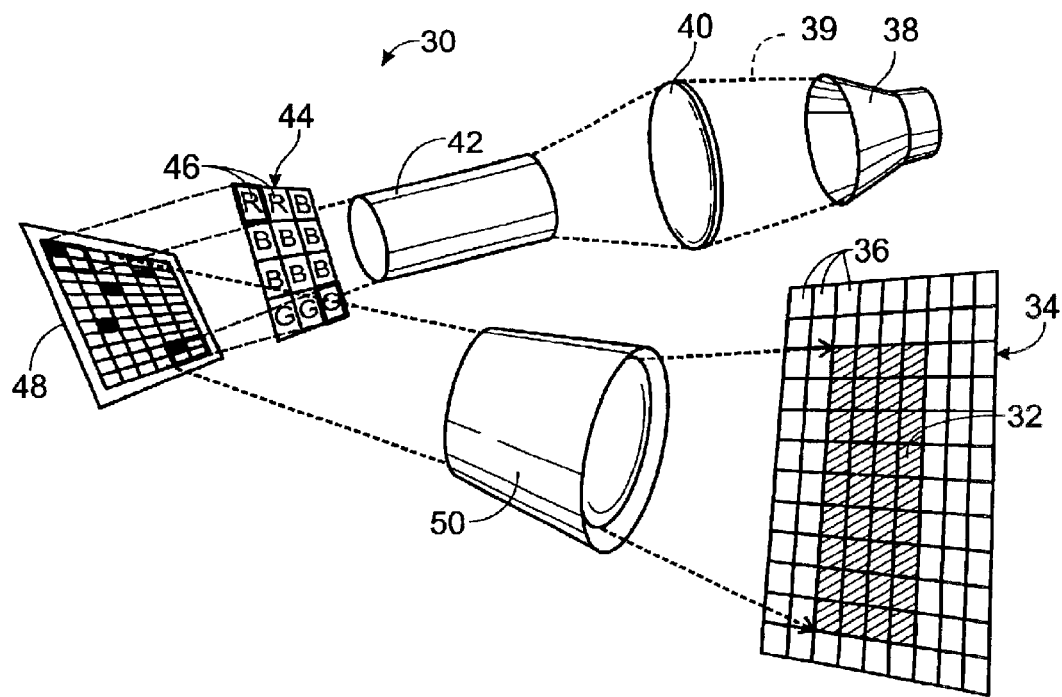

DISPLAY SYSTEM WITH LOW AND HIGH RESOLUTION MODULATORS

BACKGROUND OF THE INVENTION

Various display systems have been used over the years to generate images. Such display systems may employ image devices, such as cathode ray tubes (CRTs), liquid crystal displays (LCDs), or electrically-addressed emissive displays, e.g. plasma displays. The display systems further may incorporate a passive display screen or an active display screen.

Typically, such display systems include a light source, a color wheel, and a spatial light modulator. Light generated from the light source is directed onto the color wheel, which sequentially filters light from the light source, typically producing red light, green light, and blue light. The red light, green light, and blue light are sequentially sent to the spatial light modulator, which modulates the colored light depending on the desired image. The position of the color wheel must be tracked such that the spatial light modulator appropriately modulates light to generate an image.

The use of a color wheel may affect the image quality and cost of the display system. For example, the use of a color wheel in combination with a spatial light modulator may result in flickering and/or sequential color artifacts. The sequential color artifacts may include rainbow-colored shadows that follow rapidly moving objects in video images. Moreover, the use of a color wheel may affect the overall brightness of the image. To overcome the reduction in brightness due to the color wheel, a high-powered light source may be incorporated within the display system. However, high-powered light sources increase the cost of the display system and consume a significant amount of power during operation. Additionally, fans may be necessary to cool the light source. Such fans increase the noise and overall size of the display system.

SUMMARY OF THE INVENTION

A display system is provided, the system including an illumination source configured to produce light and direct light along an optical path, a plurality of color filters disposed in the optical path configured to generate a plurality of colored light beams, and a spatial light modulator disposed in the optical path adapted to receive and adjust the colored light beams to produce an image.

BRIEF DESCRIPTION OF THE DRAWINGS

FIG. 1 is a block diagram of a display system incorporating a low-resolution color modulator and a high-resolution light modulator according to one embodiment of the present invention.

FIG. 2 is a schematic diagram of a display system incorporating a low-resolution light filter according to another embodiment of the present invention.

DETAILED DESCRIPTION

Figure 3:
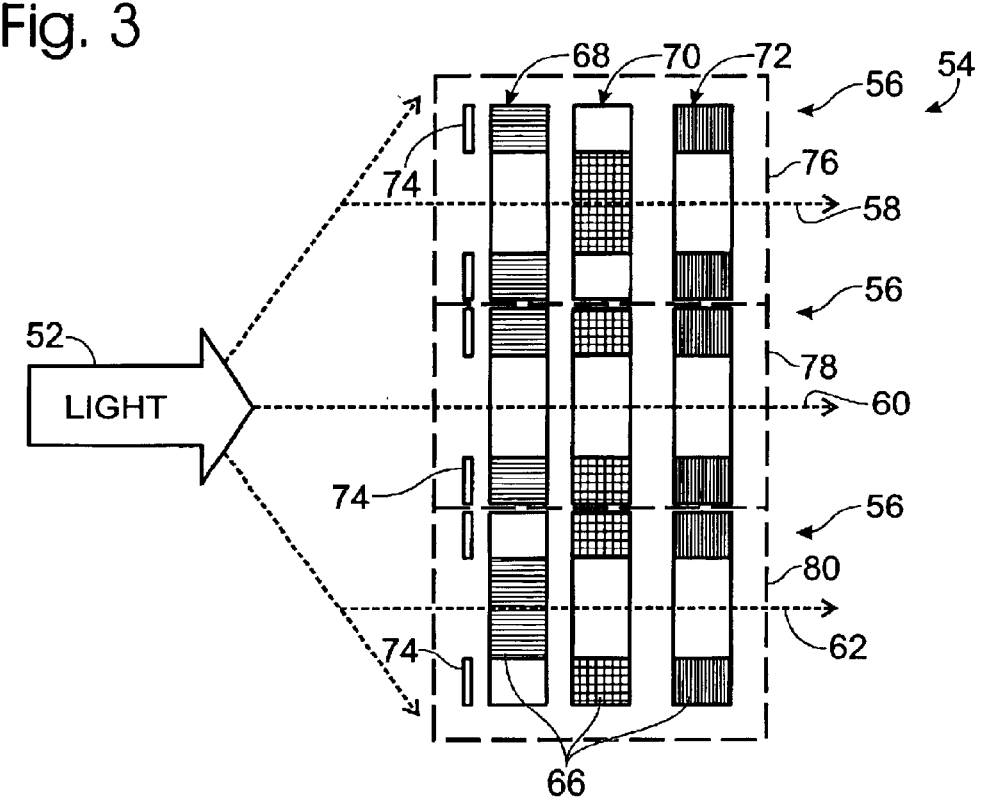
FIG. 3 is a schematic diagram of an exemplary low-resolution light filter that may be used within the system illustrated in FIG. 2.

FIG. 1 illustrates, at 10, a display system configured to generate and display images on a screen. Display system 10 may be a rear projection display system, a front projection display system, or other suitable display system.

Display system 10 typically includes a light source or illumination source 12 configured to direct light along an optical path or light path 14 toward screen 16. Screen 16 may take any suitable form, but typically is generally planar, and thus, is also referred to herein as a display surface.

Light source 12 may be any suitable device configured to generate light and direct the light toward screen 16. For example, light source 12 may be a single light source, such as a mercury lamp or other broad-spectrum light source. Alternatively, light source 12 may include multiple light sources, such as light emitting diodes (LEDs), etc.

Light generated from light source 12 further may be directed onto a low-resolution color modulator 18. Low-resolution color modulator 18, as described in more detail below, may be a spatial light modulator, such as a micromirror array, a color filter, and/or a multi-colored light source. Typically, the low-resolution color modulator produces a low-resolution color light array. Thus, as used herein, a low-resolution color modulator may include any device adapted to color separate and spatially separate a beam of light into a low-resolution color light array. A low-resolution color light array, as used herein, may include any arrangement of discrete colored light beams configured to produce a low-resolution color image.

Light source 12 and low-resolution color modulator 18 may collectively form a color light source 20. Thus, in some embodiments, the low-resolution color modulator is integral with the light source. Alternatively, the low-resolution color modulator may be independent of the light source. Regardless of the configuration, the combination of a light source and a low-resolution color modulator produces a low-resolution color light array.

The low-resolution color light array emitted or transmitted by color light source 20 may be further directed on to a high-resolution light modulator 22, or spatial light modulator, such as a micromirror array or similar device. High-resolution light modulator 22 may effectively increase the resolution of the image on screen 16. Typically, high-resolution light modulator 22 includes a plurality of mirrors or other reflective devices that correspond to individual display elements on screen 16. The mirrors within the high-resolution light modulator individually direct (e.g. by reflection) a portion of the image toward the display screen. High-resolution light modulator 22 thus may operate to effectively either "shut off" or "turn on" individual pixels. In an "on" state, colored light for a corresponding pixel typically is transmitted from high-resolution light modulator 22 onto a discrete display element on screen 16.

Typically, the low-resolution color modulator and high-resolution light modulator are arranged in series. The combination of a low-resolution color modulator and a high-resolution light modulator thus may generate a finely resolved color image. As described above, the low-resolution color modulator typically generates a low-resolution color light array that corresponds to a coarse, colored image on a screen. The high-resolution light modulator refines the coarse image such that the image appears finely resolved with minimal color artifacts. In other words, the high-resolution light modulator is configured to receive the low-resolution color light array, and to produce a higher-resolution color light array. Thus, appropriate control of the high-resolution light modulator may enhance the overall appearance of the image.

As described above, and described in more detail below, the display system may include an illumination means for directing light along an optical path, and a color-separating means in the optical path for selectively separating the light into a color light array. In some embodiments, the color light array will be a multi-color light array composed of color light beams where at least two of the color light beams are of differing colors. A spatial light modulating means may further be provided and configured to selectively modulate the color light array to produce a color image.

Display system 10 may further include a controller 24 configured to manage generation of an image. Specifically, controller 24 may manage both low-resolution color modulator 18 and high-resolution light modulator 22. For example, in some embodiments, controller 24 may manage the low-resolution color modulator such that the light is both color and spatially separated to produce a low-resolution image. Moreover, where high-resolution light modulator 22 includes a micromirror array, controller 24 may be configured to independently actuate the micromirrors of the micromirror array to define the final image and to control the color and intensity of such image on the screen.

Light traveling along optical path 14 may be further directed through projection optics 26 and onto screen 16. Projection optics 26 may include one or more projection lenses. Typically, projection optics 26 are adapted to focus, size, and position the image on screen 16.

FIG. 2 illustrates another display system 30. As indicated, display system 30 may be configured to generate an image 32 on screen 34. Typically, screen 34 includes a plurality of display elements 36 which cooperatively interact to form images on the screen. Display elements, as used herein, are image-generating structures on screen 34. Typically, display elements 36 are capable of transmitting or emitting light within the visible-light spectrum. Display elements 36 may be arranged to provide for individual display of pixels, groups of pixels, sub-pixels, groups of sub-pixels, etc.

In the depicted system 30, light source 38 may take the form of a high-pressure mercury lamp. Light source 38 thus may generate light 39, and direct it along an optical path (indicated generally by dashed lines). As indicated, light 39 may be directed through optics, such as a lens 40 (or group of lenses), an integrator rod 42, and on to a low-resolution color modulator 44.

In the illustrated embodiment, low-resolution color modulator 44 may be configured to both color separate incident light and spatially separate incident light into a plurality of color light beams. Thus, low-resolution color modulator 44 generates a low-resolution color light array composed of multiple color light beams. In some embodiments, low-resolution color modulator 44 may be a digital light filter configured to selectively pass different color light beams corresponding to individual filter elements.

As depicted, the light filter may be any suitable color filter that selectively passes some wavelengths (colors) of light and blocks or absorbs other wavelengths (colors) of light in each of plural, discrete filter elements 46, also referred to as light-generating units. Typically, the light filter separates the light into discrete beams of colored light. Also, typically, each filter element 46 corresponds to a different low-resolution portion of the overall image as expressed by a resulting beam of colored light. As will be appreciated, a single filter element 46 may correspond to multiple display elements 36 on screen 34.

The resulting beams of colored light (only two of which are shown in FIG. 2 for simplicity) are further directed along the optical path on to high-resolution light modulator 48, depicted here as a micromirror array. As discussed above, high-resolution light modulator 48 may take the form of a high-resolution spatial light modulator configured to further refine the low-resolution image generated via light filter 44. The resulting high-resolution image (shown again as a single light beam) may be further directed through optics 50 and on to screen 34 to produce image 32.

FIG. 3 illustrates one type of low-resolution color modulator that may be used within the present display system. Similar devices are illustrated and described in U.S. application Ser. No. 10/251,241, entitled FILTER FOR A DISPLAY SYSTEM, by Steven W. Steinfield, Mohammad M. Samii, Jack H. Schmidt, Matthew Giere, David Tyvoll, Noah Lassar, and Winthrop D. Childers, filed Sep. 19, 2002, and U.S. application Ser. No. 10/251,311, COLOR-GENERATING DEVICE AND DISPLAY SYSTEM, by Noah Lassar, Steven W. Steinfield, Mohammad M. Samii, Jack H. Schmidt, Matthew Giere, David Tyvoll and Winthrop D. Childers, filed Sep. 19, 2002, both applications filed contemporaneously with the present application, and hereby incorporated by reference. As illustrated, light 52, emanating from a light source, impinges low-resolution color modulator 54. Low-resolution color modulator 54 may include a plurality of image-generating units 56, indicated here as filter elements 76, 78, and 80. Light 52 passes through filter elements 76, 78, 80 along corresponding optical paths, illustrated at 58, 60, and 62. As light passes through the filter elements, the light typically is color-separated based on differing filter states of such filter elements, thus creating a plurality of colored light beams.

Each filter element of low-resolution color modulator 54 will be seen to include a plurality of color filters, 68, 70, and 72. Each color filter, in turn, may include a different color filter medium 66, which may be selectively positioned within the filter and may be configured to block or absorb some wavelengths (colors) of light and pass other different wavelengths (colors) of light. Filter medium 66 is typically a colored fluid, such as a pigmented liquid or dye. For example, filter medium 66 may be ink, toner, or other suitable colored liquid. However, it should be noted that filter medium 66 may be any medium, including a gas, gelatin resin, or other substance, which is selectively moveable into, and out of, the optical path.

In some embodiments, filter medium 66 may be charged such that applying an external electric charge (via an electrode or other suitable device) to the color filter causes the filter medium to selectively move into, and out of, the optical path. In other embodiments, the filter medium may be moved via electrocapillarity or some other mechanism or means. For example, the filters may employ chambers having variable surface characteristics. For example, the chambers may have hydrophobic surfaces coupled with one or more electrodes, whereby applying a charge to such an electrode may affect the formation of an electrical field or current that may make a region of the corresponding filter chamber less hydrophobic (more hydrophilic). By so-altering the surface characteristics of the filter, the filter medium within the chamber may be selectively moved.

The color filters within the filter elements thus may be capable of dynamically producing selected colors. As a non-limiting example, filter elements 76, 78 and 80 will be seen to each include a cyan filter 68, a yellow filter 70, and a magenta filter 72. Each of these color filters, in turn, includes a filter medium configured to pass only some wavelengths (colors) of light. For example, the filter medium in the cyan filter may block or absorb all light except cyan light, the filter medium in the yellow filter may block or absorb all light except yellow light, and the filter medium in the magenta filter may block or absorb all light except magenta light. Other color filters are possible, including, but not limited to, red filters, green filters, blue filters, etc. Moreover, although three filters are illustrated, any number of filters may be used, and such configurations are within the scope of the invention.

Color filters 68, 70, 72 may be stacked to produce multiple overlapping filter layers within a filter element. Thus, in FIG. 3, filter elements 56 include three filter layers. One skilled in the art will appreciate, however, that any number of filter layers may be used. The depth of the filter elements may depend on the number of filter layers. The footprint of a filter element may substantially correspond to the footprint of a single color filter.

Each filter element may include a light guide 74 configured to define an aperture for directing the light through the filters and along the optical path. Each light guide thus may be considered to define a light-transmission area. For example, in filter element 76, the light guide directs light through filters 68, 70, and 72 along optical path 58. Similarly, the light guide of filter element 78, directs light along optical path 60. In filter element 80, the light guide directs light along optical path 62.

In the illustrated embodiments, light passes through an optical path portion or light-transmission area, such as that corresponding to the medial portion of the depicted filters. Although illustrated herein as the medial portion, the optical path portion of the filter may be any part of the filter. Depending on the state of an individual filter, light may or may not be filtered as it passes through the optical path portion of the respective filter.

In the depicted embodiment, each color filter has two states, a pass-through state and a filtering state. In a pass-through state, light passes uninterrupted through the color filter. For example, in filter element 78, all of the color filters are in a pass-through state. Specifically, the filter medium does not interrupt the light as it travels through any of the color filters. Since effectively no filtering has occurred, white light may be passed through the filter.

In a filtering state, light passes through a filter medium as it travels along the optical path. Specifically, filter medium 66 may be selectively positioned such that at least a portion of the light must pass through the filter medium. The filter medium thus typically blocks some wavelengths (colors) of light, while other wavelengths (colors) of light are passed through when the filter modicums resides in the optical path.

For a filter element to produce colored light, one or more filters may be in a filtering state. For example, in filter element 76 of FIG. 3, cyan filter 68 and magenta filter 72 are both shown in a pass-through state, while yellow filter 70 is shown in a filtering state. In such a configuration, light 52 passes through cyan filter 68, passes through yellow filter 70 (where the filter medium obstructs the optical path and blocks out substantially all light except yellow light), and passes through magenta filter 72. The result of such a configuration is the emission of a beam of yellow light from filter element 76. Similarly, cyan light may be produced when cyan filter is in a filtering state and the other filters are in pass-through states, as illustrated by filter element 80.

Of course, colors other than cyan, yellow, and magenta may be produced using a cyan filter, a yellow filter and a magenta filter. For example, if both the cyan filter and the yellow filter are in a filtering state, then the filter element will emit a beam of green light. The green color results because the cyan filter blocks red light, but passes green light and blue light, and the yellow filter blocks blue light, but passes green light and red light. Thus, since the cyan filter generally passes only green light and blue light, and the yellow filter generally passes only green light and red light, the only color to pass through both filters is the green light. Furthermore, the combination of all the filters in a filtering state may produce a dark display element.

As will be appreciated, the above-described low-resolution color modulator may obviate the need for a color wheel. In a system employing a color wheel, the number and size of the color space on the color wheel limits the time allocated to any particular color. Specifically, if a color wheel is equally divided between red, green, and blue, the time allocated to any particular color, such as red, is 33%. Moreover, since red light is only a portion of white light, substantially less than 33% of the applied light may be available to produce a red object.

In contrast, the color filters in a low-resolution spatial light and color modulator may be configured to pass substantially all the light directed through it. Specifically, when all of the filters in a single filter element are in pass-through states, the filter element may pass nearly 100% of the white light through the filter element. Moreover, since there need not be any time interleave of filter elements in the proposed arrangement, there need not be any light lost to color sequencing by a static color wheel. Such a configuration enables the use of lower-powered light sources because significantly less light is lost in generation of the image than would be using a color wheel or other sequential light filter. Since a lower-powered light source may be used, less power is needed. Thus, the effective life of a battery within such a device incorporating a layered filter display, such as that now described, may be increased. Similarly, the device may be smaller and lighter weight, since less power is needed for the light source.

Figure 4:
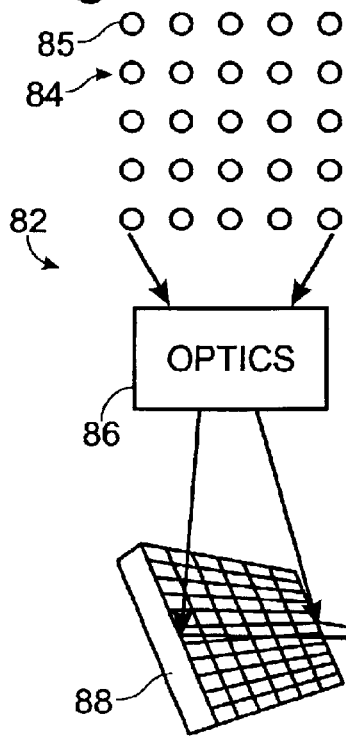
FIG. 4 is a somewhat schematic diagram of a display system including a color light generator with a plurality of image-generating units according to another embodiment of the present invention.

FIG. 4 illustrates another display system, indicated generally at 82. In depicted system 82, the light source and low-resolution color modulator are integrated together to form a color light generator 84 which is configured to produce a low-resolution color light array. Specifically, color light generator 84 may include a plurality of image-generating units 85. Image-generating unit 85 may include a plurality of color-emitting elements, such as light emitting diodes (LEDs) configured to generate a low-resolution pattern of light. Specifically, the color-emitting elements in the depicted embodiment may be red-emitting elements, green-emitting elements, and blue-emitting elements, which are configured to generate a low-resolution pattern of red, green, and blue light. Alternatively, in some embodiments, the light generator may include a light source with a liquid crystal display (LCD) spatial light modulator.

The pattern of light emitted from color light generator 84, in turn, may be directed through optics 86. Optics 86, in turn, may direct light from color light generator 84 to high-resolution light modulator 88, such as a micromirror array. As discussed above, it will be appreciated that high-resolution light modulator 88 may further refine the image. The resulting light may then be directed through projection optics 90 and onto screen 92.

Figure 5:
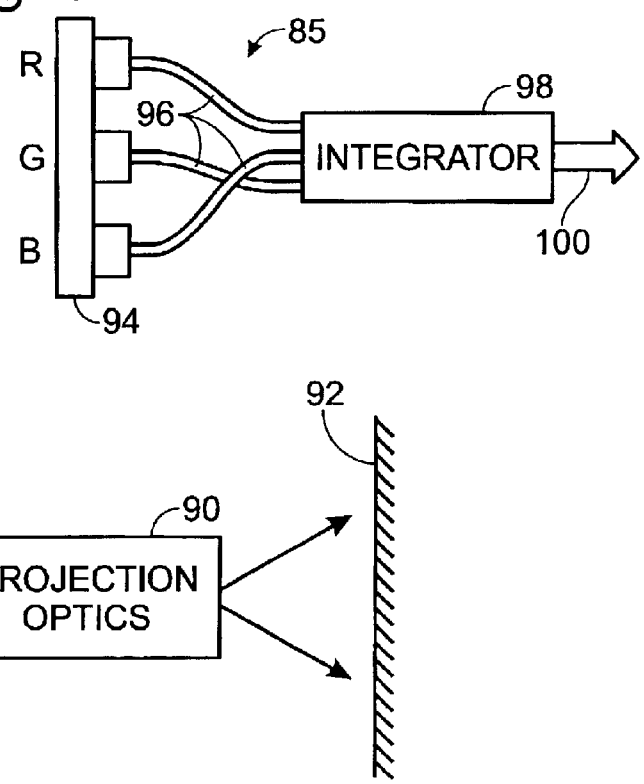
FIG. 5 is a schematic diagram of an image-generating unit as illustrated in FIG. 4.

FIG. 5 further illustrates the configuration of an exemplary image-generating unit 85. Each image-generating unit or color bundle 85 may include a is color light-emitting array 94. As illustrated, color light-emitting array 94 may include a plurality of light-emitting elements, such as light emitting diodes (LEDs). In the exemplary illustration, three LEDs are shown extending from color light-emitting array 94, specifically, a red LED (R), a green LED (G), and a blue LED (B). It should be noted that other colors and types of light-emitting elements may be used in combination with, or independently of, the light-emitting elements shown in FIG. 5.

The light-emitting elements are coupled with optical fibers 96. For example, a red LED is associated with a red optical fiber, a blue LED is associated with a blue optical fiber, and a green LED is associated with a green optical fiber. The optical fibers are combined through a light integrator 98. Thus, each image-generating unit includes addressable light-emitting elements. Specifically, the image-generating unit shown in FIG. 5 is configured to selectively produce color light, such as red, green and blue light, indicated at 100.

As discussed above, the light from the image-generating units produces a low-resolution image. The high-resolution light modulator may then be used to refine the low-resolution image. It should be noted that if the high-resolution light modulator simply reflects all light from the low-resolution color modulator, a low-resolution image will be provided on the screen. By controlling individual mirrors of the high-resolution spatial modulator, it is possible to enhance the low-resolution image produced by the low-resolution color modulator.

Accordingly, as set forth above, a method for displaying images on a display surface is provided which includes generating a low-resolution color light array, directing the low-resolution color light array onto a high-resolution spatial modulator, selectively modulating portions of the low-resolution color light array to generate a high-resolution image, and directing the high-resolution image onto a display surface to produce an image. It should be appreciated that generating a low-resolution color light array may include emitting light from a plurality of spatially-separated color-emitting elements, emitting light from a low-resolution color modulator, and/or directing light through a plurality of color light filters configured to selectively emit a plurality of color light beams which collectively form the low resolution color light array.

The combination of a low-resolution color modulator and a high-resolution light modulator simulates the operation of human eyes. Specifically, the human eye includes multiple photoreceptors, such as cones and rods. The eye perceives color differences with a relatively low resolution of cones. The low-resolution color modulator of the display systems described herein, produces a low-resolution color image that is adapted to be readily perceived by the cones in the human eye. The high-resolution light modulator produces a more refined image. Production of the image with a high-resolution light modulator correlates to rods in the eye that are adapted to perceive gray scales.

While various alternative embodiments and arrangements of a display system incorporating both a low-resolution color modulator and a high-resolution light modulator have been shown and described above, it will be appreciated by those of skill in the art that numerous other embodiments, arrangements, and modifications are possible and are within the scope of the invention. In other words, those skilled in the art will understand that many variations may be made therein without departing from the spirit and scope of the invention as defined in the following claims. The description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element or the equivalent thereof, such claims should be understood to include incorporation of one or more such elements, neither requiring, nor excluding, two or more such elements.

What is claimed is:

1. A display system comprising:
    an illumination source configured to produce light and direct light along an optical path;
    a low-resolution color modulator disposed in the optical path and configured to modulate the right to generate a low-resolution color image; and
    a high-resolution light modulator disposed in the optical path and configured to refine the low-resolution image.

2. The display system of claim 1, wherein the low-resolution color modulator includes a plurality of image-generating units.

3. The display system of claim 2, wherein each image-generating unit includes a plurality of color filters, each color filter being configured to selectively produce a color.

4. The display system of claim 3, wherein each color filter includes a moveable filter medium selectively positional within the optical path.

5. The display system of claim 1, wherein the illumination source and the low-resolution color modulator collectively form a color light generator.

6. The display system of claim 5, wherein the color light generator includes a plurality of color-emitting elements.

7. The display system of claim 6, wherein the color-emitting elements are light emitting diodes.

8. The display system of claim 1, wherein the high-resolution light modulator is a micromirror array.

9. A display system comprising:
    an illumination source configured to produce light and direct light along an optical path;
    a plurality of color filters disposed in the optical path and configured to generate a low-resolution color image; and
    a spatial light modulator disposed in the optical path adapted to receive the low-resolution color image and adjust resolution of the low-resolution color image.

10. The display system of claim 9, wherein each color filter includes a moveable filter medium selectively positional within the optical path.

11. A display device comprising:
    a color light source configured to generate a low-resolution color light array;
    a high-resolution light modulator configured to receive the low-resolution color light array and to produce a higher-resolution color light array; and
    a display surface configured to receive the higher-resolution color light array to produce an image based on such higher-resolution color light array.

12. The display device of claim 11, wherein the low-resolution color light array corresponds to a low-resolution color image.

13. The display device of claim 11, wherein the color light source includes a light source and a low-resolution color modulator.

14. The display device of claim 13, wherein the low-resolution color modulator includes a plurality of image-generating units configured to spatially separate and color separate light from the light source.

15. The display device of claim 14, wherein each image-generating unit includes at least one color filter configured to selectively emit a color light beam.

16. The display device of claim 11, wherein the color light source includes a plurality of color-emitting elements.

17. The display device of claim 11, wherein the color light source includes an array of red, green, and blue light-emitting diodes.

18. A method for displaying an image, the method comprising:

generating a low-resolution color light array;

directing the low-resolution color light array onto a high-resolution spatial modulator;

selectively modulating portions of the low-resolution color light array to generate a high-resolution image; and directing the high-resolution image onto a display surface to produce an image.

19. The method of claim 18, wherein generating a low-resolution color light array includes emitting light from a plurality of spatially-separated color-emitting elements.

20. The method of claim 18, wherein generating a low-resolution color light array includes emitting light from a low-resolution color modulator.

21. The method of claim 18, wherein generating a low-resolution color light array includes directing light through a plurality of color light filters configured to selectively produce a plurality of color light beams which collectively form the low resolution color light array.

22. The method of claim 21, wherein at least two of the plurality of color light beams are of differing colors.

23. A display system configured to display an image, the system comprising:

illumination means for directing light along an optical path;

color-separating means in the optical path for selectively separating the light to generate a low-resolution color image; and spatial light modulating means in the optical path for selectively refining the low-resolution color image.

24. The display system of claim 23, wherein the spatial light modulating means produces a high-resolution color image.

25. The display system of claim 23, further comprising a display surface in the optical path for presenting the image.

26. A display system configured to display an image, the system comprising:

an illumination source configured to produce and direct light along an optical path;

a color modulator in the optical path for selectively generating a low-resolution color image; and a spatial light modulator configured to selectively modulate the low-resolution color image to produce a high-resolution color image.

27. A display system comprising:

an illumination source configured to produce light and direct light along an optical path;

a spatial light modulator disposed in the optical path and configured to spatially modulate the light to generate a low-resolution color image; and a high-resolution light modulator disposed in the optical path and configured to reline the low-resolution image.

28. The display system of claim 27, wherein the spatial light modulator includes a plurality of color filters, each color filter being configured to selectively produce a color.

29. The display system of claim 28, wherein each color filter includes a moveable filter medium selectively positional within the optical path.

30. The display system of claim 27, wherein the high-resolution light modulator is a micromirror array.

* * * * *